(12) United States Patent
Albonetti

(10) Patent No.: US 10,974,872 B2
(45) Date of Patent: Apr. 13, 2021

(54) APPARATUS AND METHOD FOR INJECTION MOULDING A CAP WITH A TAMPERPROOF RING

(71) Applicant: SACMI COOPERATIVA MECCANICI IMOLA SOCIETA' COOPERATIVA, Imola (IT)

(72) Inventor: Danilo Albonetti, Imola (IT)

(73) Assignee: SACMI Cooperativa Meccanici Imola Societa' Cooperativa

(*) Notice: Subject to any disclaimer, the term of this patent is extended or adjusted under 35 U.S.C. 154(b) by 294 days.

(21) Appl. No.: 16/084,486

(22) PCT Filed: Feb. 14, 2017

(86) PCT No.: PCT/IB2017/050817
§ 371 (c)(1),
(2) Date: Sep. 12, 2018

(87) PCT Pub. No.: WO2017/158450
PCT Pub. Date: Sep. 21, 2017

(65) Prior Publication Data
US 2019/0100359 A1  Apr. 4, 2019

(30) Foreign Application Priority Data
Mar. 14, 2016  (IT) .................. 102016000026443

(51) Int. Cl.
B65D 41/34 (2006.01)
B29C 45/14 (2006.01)
(Continued)

(52) U.S. Cl.
CPC ...... *B65D 41/3438* (2013.01); *B29C 33/0044* (2013.01); *B29C 33/123* (2013.01);
(Continued)

(58) Field of Classification Search
None
See application file for complete search history.

(56) References Cited

U.S. PATENT DOCUMENTS

| 3,247,548 A | 4/1966 | Fields et al. |
| 3,913,771 A | 10/1975 | Acton et al. |

(Continued)

FOREIGN PATENT DOCUMENTS

| CN | 1117722 A | 2/1996 |
| CN | 102069562 A | 5/2011 |

(Continued)

*Primary Examiner* — Matthew J Daniels
*Assistant Examiner* — Paul Spiel
(74) *Attorney, Agent, or Firm* — laubscher & Laubscher, P.C.

(57) ABSTRACT

A method and an apparatus form aluminium screw capsules with a safety ring made of synthetic plastics for tamperproof closing of containers. An aluminium capsule body is inserted into a moulding cavity of a mould conformed and arranged for the overmoulding of a safety ring on an edge of an annular wall of the capsule body. An annular sealing zone is defined for the synthetic plastic material between a first surface of the capsule body and a mould first portion inserted into the central cavity of the capsule body to form a safety ring anchored to the capsule body.

5 Claims, 12 Drawing Sheets

(51) Int. Cl.
*B29C 33/00* (2006.01)
*B65D 41/00* (2006.01)
*B29L 31/56* (2006.01)
*B29L 31/00* (2006.01)
*B29C 33/12* (2006.01)

(52) U.S. Cl.
CPC ........ *B29C 45/14336* (2013.01); *B65D 41/00* (2013.01); *B29L 2031/56* (2013.01); *B29L 2031/565* (2013.01); *B29L 2031/7174* (2013.01); *B32B 2435/00* (2013.01); *B32B 2435/02* (2013.01)

(56) References Cited

U.S. PATENT DOCUMENTS

| | | | |
|---|---|---|---|
| 4,418,828 A | 12/1983 | Wilde et al. | |
| 4,497,765 A | 2/1985 | Wilde et al. | |
| 4,511,053 A | 4/1985 | Brandes et al. | |
| 4,552,328 A * | 11/1985 | Dutt | B29C 45/40 249/59 |
| 4,694,969 A | 9/1987 | Granat | |
| 4,981,230 A | 1/1991 | Marshall et al. | |
| 5,071,339 A | 12/1991 | Murayama et al. | |
| 5,685,443 A * | 11/1997 | Taber | B29C 45/14336 215/252 |
| 2001/0053289 A1 | 12/2001 | Imanari et al. | |
| 2003/0121880 A1 | 7/2003 | Smith | |
| 2011/0204546 A1 | 8/2011 | Medvedev | |

FOREIGN PATENT DOCUMENTS

| | | |
|---|---|---|
| DE | 1508639 B1 | 12/1969 |
| DE | 202015101522 U1 | 7/2015 |
| EP | 2343246 A1 | 7/2011 |
| EP | 2818298 A2 | 12/2014 |
| WO | 2015092644 A1 | 6/2015 |

\* cited by examiner

APPARATUS AND METHOD FOR INJECTION MOULDING A CAP WITH A TAMPERPROOF RING

CROSS-REFERENCE TO RELATED APPLICATIONS

This application is a § 371 National Stage Entry of PCT/IB2017/050817 filed Feb. 14, 2017. PCT/IB2017/050817 claims priority to Patent Application No. IT-102016000026443 filed Mar. 14, 2016. The entire content of these applications is incorporated herein by reference.

BACKGROUND OF THE INVENTION

The invention relates to a moulding method and apparatus, in particular for moulding a capsule with a safety device for closing a neck of a container, for example a capsule including a capsule body made of metallic material and a safety ring made of synthetic plastic material.

Specifically, but not exclusively, the invention can be applied to moulding a capsule for closing a glass bottle, for example a capsule including a metal capsule body with a side wall coupled by screw coupling to a thread on the neck of the bottle.

The Brandes, et al U.S. Pat. No. 4,511,053 shows a capsule for closing a neck of a container, in which the capsule includes a capsule body made of metallic material and a safety ring made of synthetic plastic material. The safety ring is moulded separately by injection of synthetic plastic material and is then assembled and dovetailed into the capsule body.

The Murayama, et al U.S. Pat. No. 5,071,339 shows a capsule including a capsule body made of metallic material and a manual grasping ring made of synthetic plastic material. The gripping ring is moulded directly by overmoulding on the capsule body.

It is desirable to improve the prior art, for example the Brandes, et al U.S. Pat. No. 4,511,053, for moulding a capsule including a metal capsule body and a safety ring made of synthetic plastics. In particular, it is desirable to simplify and/or accelerate the various steps of the method, such as for example the assembly step. It would be further advantageous to improve the coupling strength between the metal capsule body and the synthetic plastics safety ring. It would also be desirable to reduce the synthetic plastic material and/or the metallic material used to mould the capsule.

The Taber, et al U.S. Pat. No. 5,685,443 shows a forming method and apparatus, wherein a mould has a central portion, an upper half-portion, a bottom half-portion, and a closed position with a first sealing area between the capsule body and the central portion, and a second sealing area between the capsule body and the upper half-portion, without contact between the capsule body and the bottom half-portion, whereby there is no sealing area in which the capsule body contacts both half-portions, nor any sealing area in which the central portion contacts both half-portions.

U.S. Pat. No. 5,685,443 shows another forming apparatus according to the prior art.

Patent Publication DE 202015101522 U1 shows a metal screw cap with a plastic safety ring divided into segments by axial longitudinal slots and, in the lower limit region, by material bridges which are broken when the cap is unscrewed, whereby the segments are deformed outwardly passing over a ring projecting from the neck of the bottle.

SUMMARY OF THE INVENTION

One object of the invention is to provide a moulding method that is able to overcome one or more of the aforesaid drawbacks of the prior art.

One advantage is to simply and inexpensively form a capsule with a metal capsule body and a safety ring made of synthetic plastics.

One advantage is to increase the productivity of moulding capsules with a metal capsule body and a safety ring made of synthetic plastics.

One advantage is to economise on the quantity of synthetic plastic material and/or the metallic material used for forming capsules.

One advantage is to improve the coupling strength between the metal capsule body and the safety ring made of synthetic plastics.

One object of the invention is to make an apparatus for forming capsules with a metal capsule body and a safety ring made of synthetic plastics that is simply and inexpensively constructed.

One object of the invention is to make available a capsule that is suitable for closing containers and including at least one metal capsule body and at least one safety ring made of synthetic plastics.

In one embodiment, a method for moulding capsules (for example screw capsules) for tamperproof closing of containers includes the step of arranging a capsule body (made of a first material, in particular of a metallic material, for example of aluminium) in a moulding cavity of a mould conformed and arranged for the overmoulding of a safety ring (made of a second material different from the first material, in particular of a synthetic plastic material) on the capsule body, in the moulding cavity there being defined at least one annular sealing zone of synthetic plastic material between a first internal surface of the capsule body and a first mould portion inserted into a central internal cavity of the capsule body, for overmoulding the safety ring, that will be stably and strongly anchored to the capsule body.

BRIEF DESCRIPTION OF THE DRAWINGS

The invention can be better understood and implemented with reference to the attached drawings which illustrate some embodiments thereof by way of non-limiting examples.

DETAILED DESCRIPTION

Figure 1:
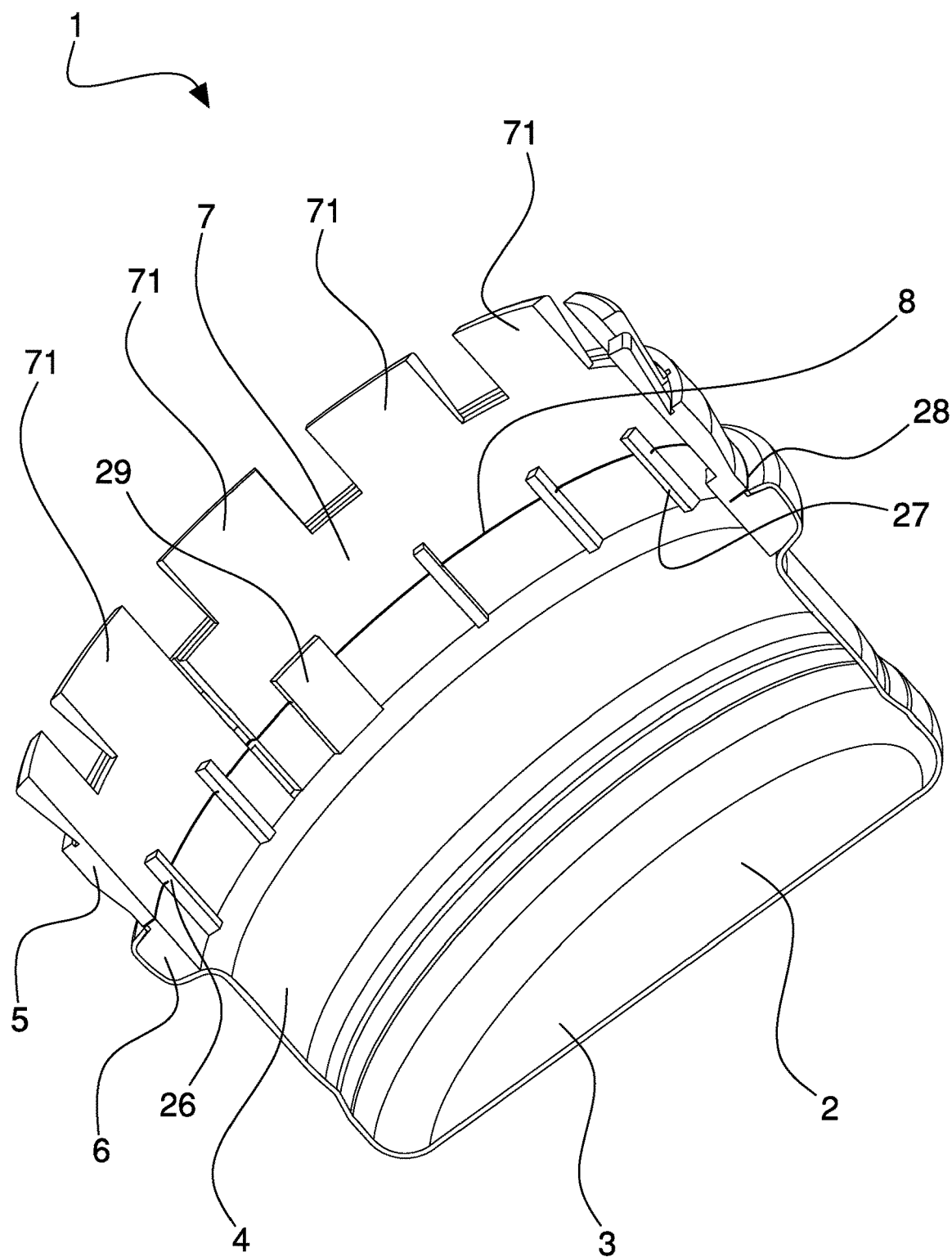
FIG. 1 is a perspective view of a first embodiment of a capsule made using a method according to the invention.

In this description identical elements that are common to the various illustrated embodiments have been indicated by the same numbering.

A capsule 1 is provided for closing containers, in particular containers provided with a neck, for example bottles made of glass, plastics or metal. The capsule may be, in particular, of the screw type. The capsule 1 may be provided, for example, with an inner thread (made, in particular, in a known manner) for coupling with an outer thread on the neck of the container.

The capsule 1 may include, as in these embodiments, at least one capsule body 2 made at least partially of metallic material, for example of aluminium or alloys of aluminium or of another plastically deformable material. The capsule body 2 may include, in particular, at least one upper closing wall 3 intended for closing the container. The closing wall 3 may include, for example, a disc-shaped wall. The capsule body 2 may include, in particular, at least one annular side wall 4 intended for a screw connection with the neck of the container. The annular wall 4 may include, for example, a skirt-shaped wall. The annular wall 4 may depend from a perimeter of the closing wall 3.

The capsule body 2 may include a single piece of deformable metal material. The capsule body 2 may be made by drawing in a press of a known type.

The capsule 1 may include, as in these embodiments, at least one safety ring 5 at least partially made of synthetic plastic material such as polyethylene, polypropylene, or another thermoplastic resin. The safety ring 5 may include, in particular, at least one connecting portion 6 connected (solidly constrained) to an annular edge of the annular wall 4. The safety ring 5 may include, in particular, at least one annular detachable portion 7 connected to the connecting portion 6 by an annular weakening zone 8 intended to be broken upon opening of the capsule 1. The detachable portion 7 may include a fin portion 71 that is foldable inwardly that will form an abutment that, in use, at the first opening of the capsule, abuts a protrusion of the container neck causing the weakening zone 8 to break.

Figure 4:
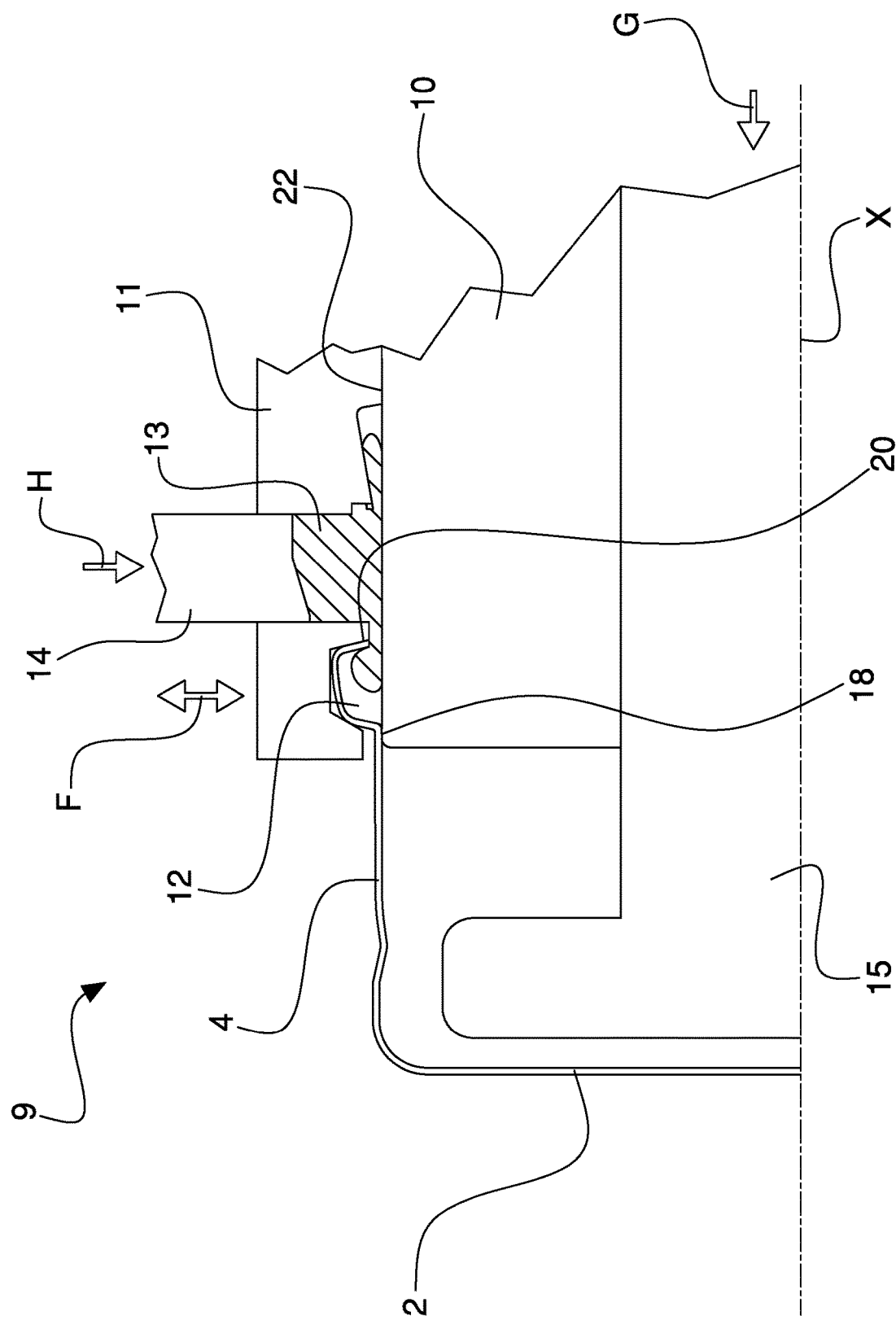
FIG. 4 is a diagram of a section of a moulding apparatus that is usable in the method for making the capsule in FIG. 1 in an operating configuration during the step of introducing the synthetic plastic material into the moulding cavity.

A moulding apparatus 9 is used for moulding a capsule (such as, for example, the capsule 1) for closing containers, provided with a device (such as, for example, the safety ring 5) for tamperproofing the container is shown in FIG. 4. The moulding apparatus 9 is configured, to form a capsule 1 including a capsule body 2 made of a first material, for example, metal, and a safety ring 5 made of a second material, different from the first material, for example, synthetic plastics.

The moulding apparatus 9 may be an element of a moulding carousel that rotates around a vertical rotation axis and carries a plurality of moulding apparatuses, like the apparatus 9, angularly spaced apart from one another on a periphery of the carousel. The moulding carousel may be operationally associated with an extruder that supplies the synthetic plastic material and may be provided with removing apparatus that, at each revolution of the carousel, removes at least one dose of synthetic plastic material from a nozzle of the extruder for each moulding apparatus 9.

The moulding apparatus 9 may include, in particular, a mould first portion 10 that is insertable into the capsule body 2. The mould first portion 10 may include, as in this embodiment, a tubular body with a cylindrical outer surface having at least one diameter that is the same as a diameter of an inner surface of the capsule body 2 so as to contact the capsule body 2 inner surface and to make a sealing zone to prevent leaking of the synthetic plastics material, as will be explained below.

The moulding apparatus 9 may include, in particular, at least two mould half-portions 11 (each in the shape of a half-ring) that may be arranged around the mould first (central) portion 10 and around an end edge portion of the capsule body 2 to define a mould for overmoulding synthetic plastic material on the end portion.

Figure 5:
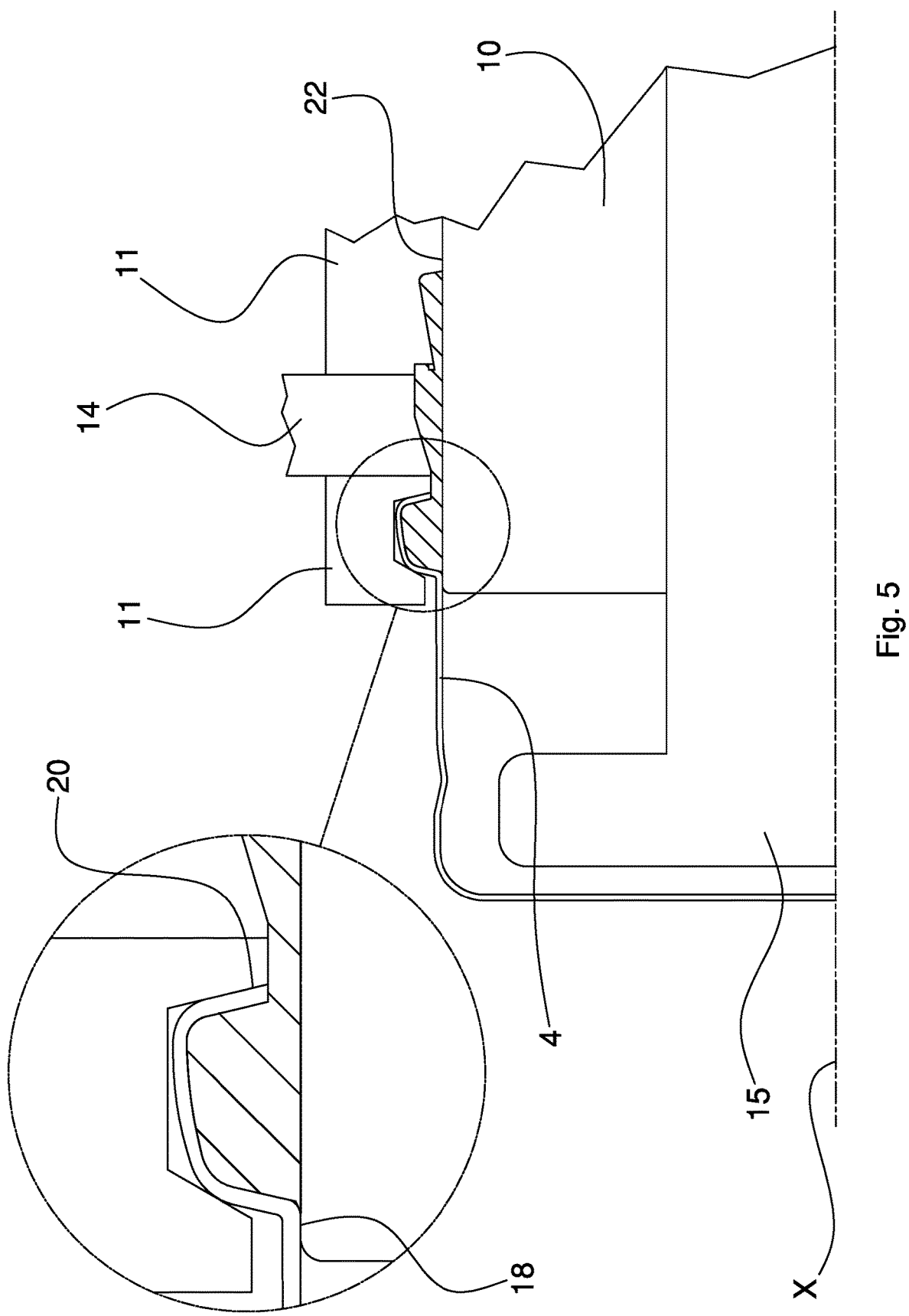
FIG. 5 is the diagram of FIG. 4 in an operating configuration in which the moulding cavity has been filled with the synthetic plastic material.

The two (or more) mould half-portions 11 are movable in relation to one another (each according to a radial direction F, where radial is defined as a reference to an axis X of the moulding apparatus 9 coinciding with an axis X of the capsule when the latter is inserted into the apparatus), with the possibility of adopting at least one open position, in which the capsule body 2 is insertable between the two mould half portions 11 and the mould first portion 10, and at least one closed position (FIGS. 4 and 5), in which the two mould half portions 11 and the mould first portion 10 define a moulding cavity 12 that is suitable for overmoulding a safety ring 5 on the capsule body 2.

The axis X of the apparatus 9 and of the capsule 1 may be oriented, for example, in a horizontal direction. Nevertheless, the aforesaid axis X may also be oriented in other directions, for example with a given tilt with respect to the horizontal.

The two mould half-portions 11 (the opening and closing motion of which may include, for example, a linear mutual approach and distancing movement) may form, overall when they are closed a second peripheral moulding portion with a tubular shape that surrounds the mould first portion 10 and which, in collaboration with the latter, defines the moulding cavity 12.

The moulding apparatus 9 may include, in particular, at least one inlet channel 13 that is obtained in at least one of the two mould half-portions 11 and communicates with the moulding cavity 12.

The moulding apparatus 9 may include, in particular, a supply device for introducing a dose of synthetic plastic material inside the inlet channel 13. This supply device is of a known type and includes an extruder provided with at least one synthetic plastic material dispensing nozzle and a separator for separating a dose of material from the continuous flow dispensed through the nozzle.

The moulding apparatus 9 may include at least one pushing element 14 such as a piston that is movable in a direction H, by driving a cam-driven actuator into the inlet channel 13 to fill the moulding cavity 12 with the synthetic plastic material. The pushing element 14 may befixed, rigidly connected, integrated, or integrally connected with the apparatus that separates the dose from the extruder.

The moulding apparatus 9 may include, in particular, at least one extractor 15 that may slide in an axial direction G in a cavity inside the mould first portion 10 to push the capsule body 2 with the already moulded safety ring 5 and extract the capsule body 2 from the mould for subsequent processing.

With reference to FIGS. 10 to 13, certain diagrams of capsule moulding plants are illustrated. Each moulding plant includes a production line that includes various machines arranged in series one after the other. The production line may include, in particular, a continuous operating line.

Figure 10:
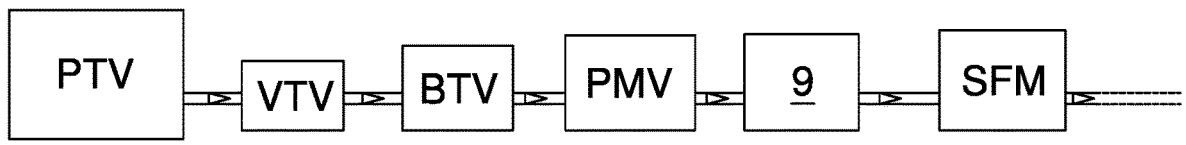
FIGS. 10 to 13 illustrate four diagrams of as many embodiments of manufacturing plants including the moulding apparatus of FIG. 4.

The production line of FIG. 10 may include a screw cap press PTV where the raw capsule bodies are formed from metal sheets. The production line may include a screw cap screen VTV arranged downstream of the press PTV where separation between the raw capsule bodies and processing waste occurs.

The production line may include a screw cap edgebander BVT arranged downstream of the press PTV and/or of the screen VTV where an annular edge of the capsule bodies is knurled to form a cap gripping zone. The production line may include a machine PMV for moulding seals arranged downstream of the press PTV and/or of the screen VTV and/or of the edgebander BTV, where the internal coating is formed and acts as a seal of the capsule on the container.

The production line may include at least one moulding apparatus 9 made in accordance with the present invention moulding the anti-tamper device (safety ring 5) arranged downstream of the press PTV and/or of the screen VTV and/or of the edgebander BTV and/or of the machine PMV.

Figure 6:
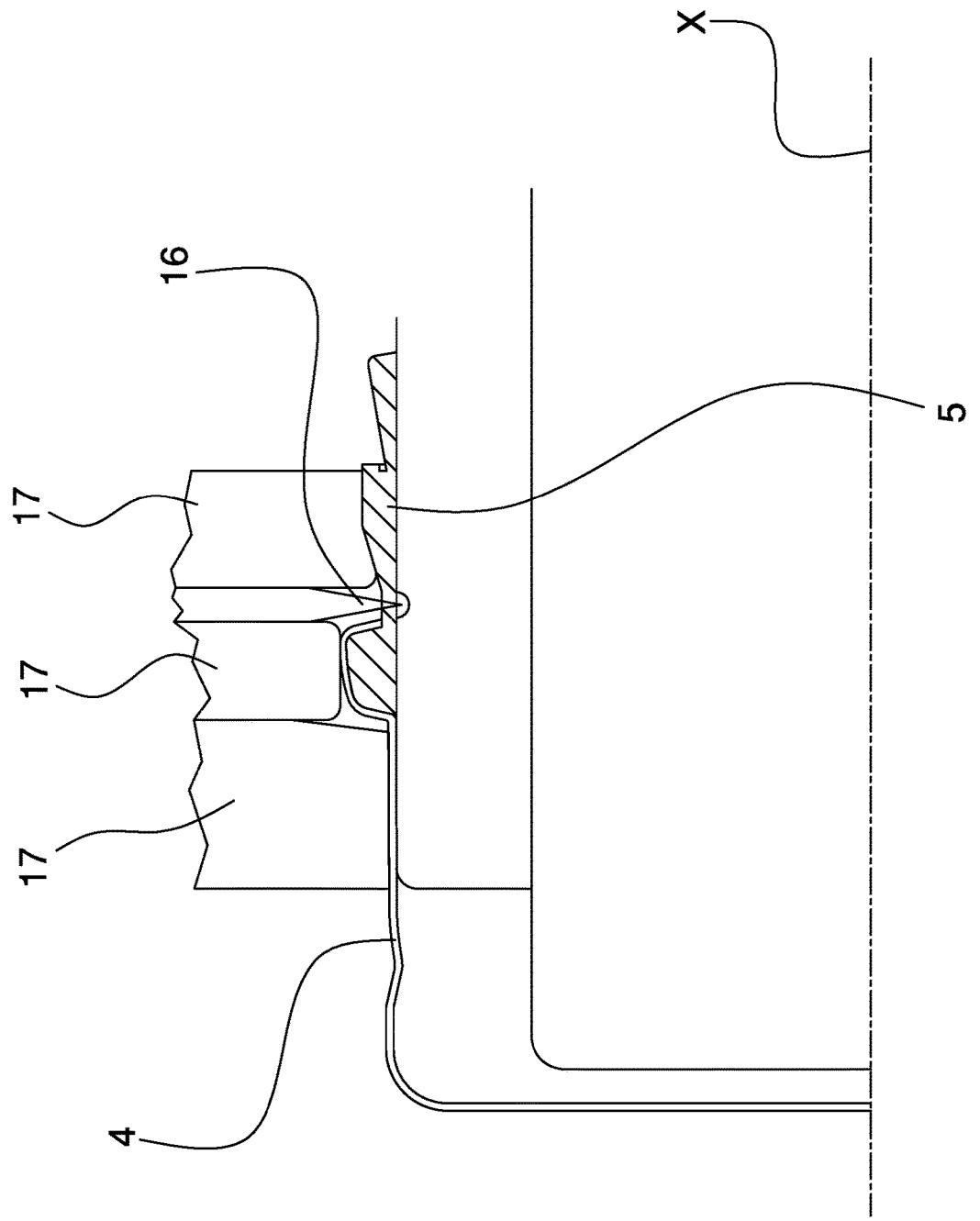
FIG. 6 is a diagram of a section of a cutting apparatus that is usable for forming the facilitated fracture zone in the capsule.

The production line may include a cutting and/or moulding machine SFM (for example of known type) for cutting and/or folding the safety ring 5 arranged downstream of the press PTV and/or of the screen VTV and/or of the edgebander BTV and/or of the machine PMV and/or of the apparatus 9. The machine SFM may include a cutting apparatus as shown in FIG. 6 with at least one blade 16 and a capsule stopping system 17 configured for retaining the capsule in position during cutting, for example a capsule stopping system of known type. The machine SFM may include a folding device configured for inwardly folding at least one fin portion of the safety ring.

The screen VTV and/or the edgebander BTV and/or the machine PMV and/or the apparatus 9 and/or the machine SFM may each include a continuously rotating carousel that can carry a plurality of products (capsules or capsule bodies) arranged angularly spaced apart from one another and that has an inlet for reserving the products to be processed, a circular arch path, where the products are processed on the basis of the machining task to be performed, and an outlet of the processed products. The various carousels may be arranged in line one after the other so as to perform continuous processing.

Figure 11:
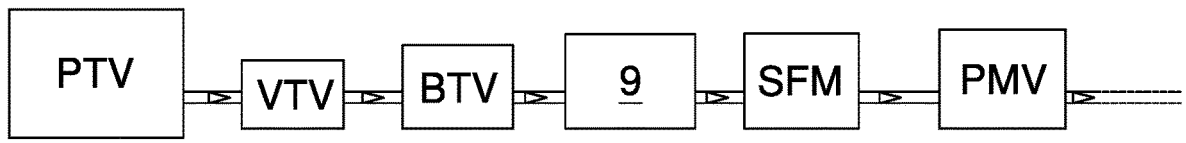

As illustrated in FIG. 11, the production line may include a machine PMV for moulding seals that, as in the embodiment of FIG. 10, may be arranged downstream of the press PTV and/or of the screen VTV and/or of the edgebander BTV and/or of the apparatus 9 and/or of the cutting and/or moulding machine SFM.

Figure 12:
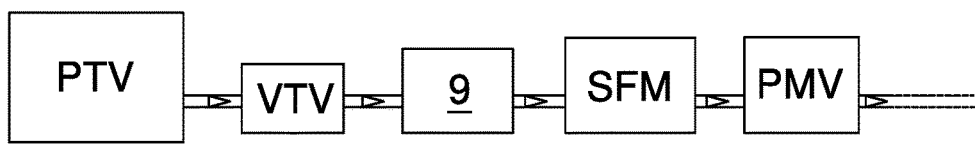

As illustrated in FIG. 12, the production line may include a cutting and/or moulding machine SFM that may include in itself also the functions of a screw cap edgebander BTV, so that the machine SFM may include an apparatus for knurling an annular edge of the capsule bodies to form a cap gripping zone. This production line may be suitable for forming the capsule illustrated in FIG. 8, which will be disclosed in greater detail below.

Figure 13:
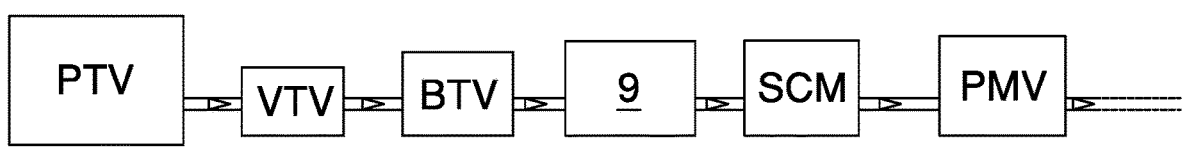
Figure 14:
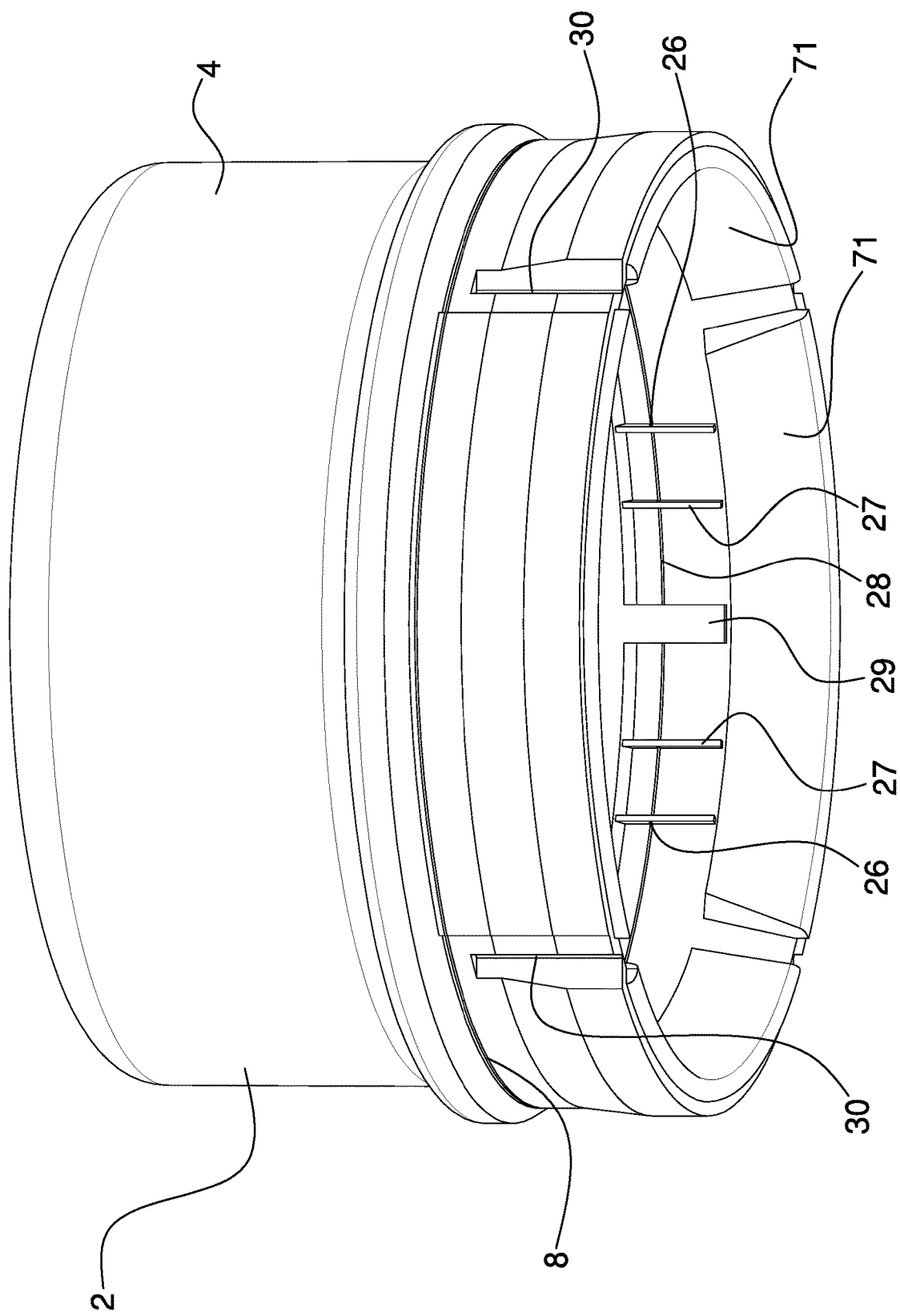
FIG. 14 is a perspective view of a fifth embodiment of a capsule made with a method according to the invention.
Figure 15:
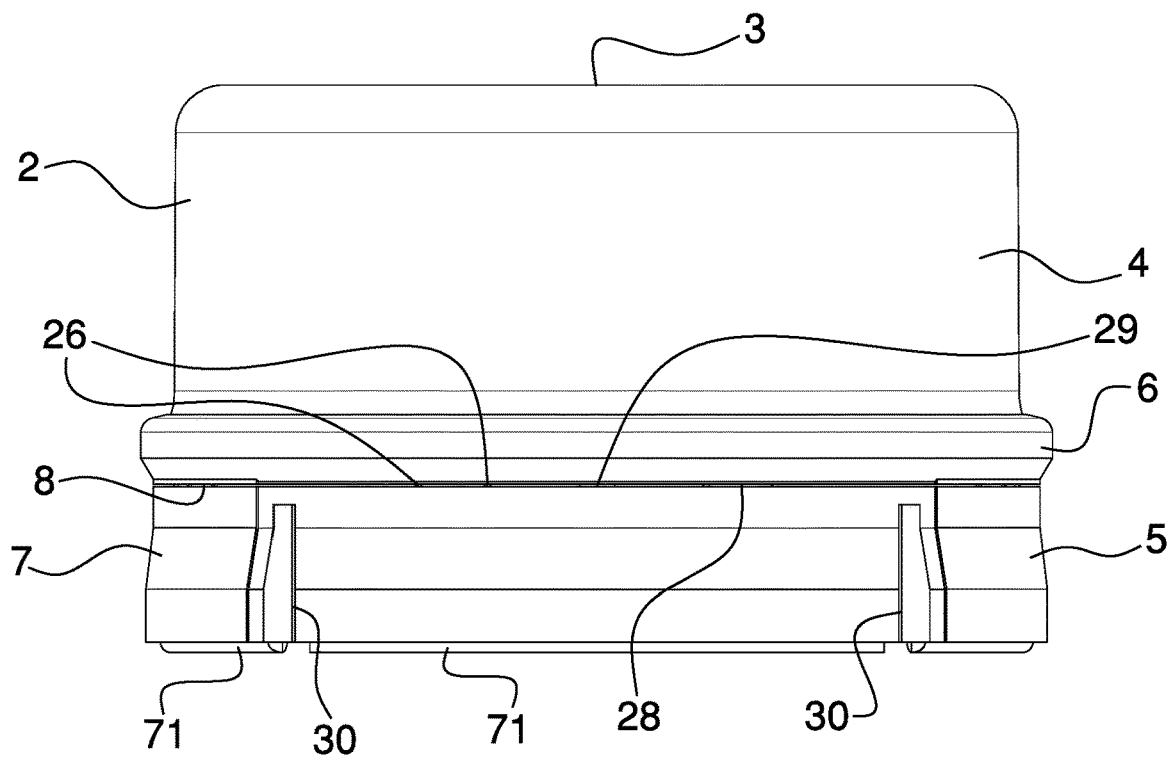
FIG. 15 is a side view of the capsule of FIG. 14.
Figure 16:
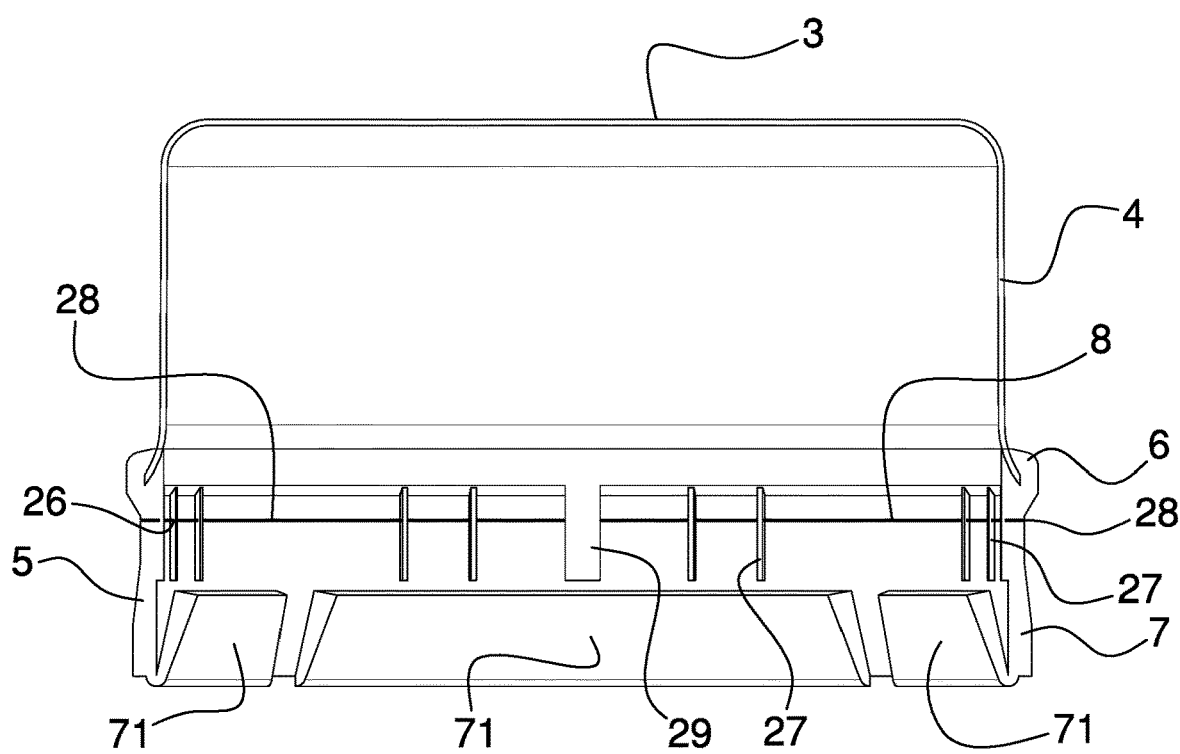
FIG. 16 is a section of the capsule of FIG. 14.
Figure 17:
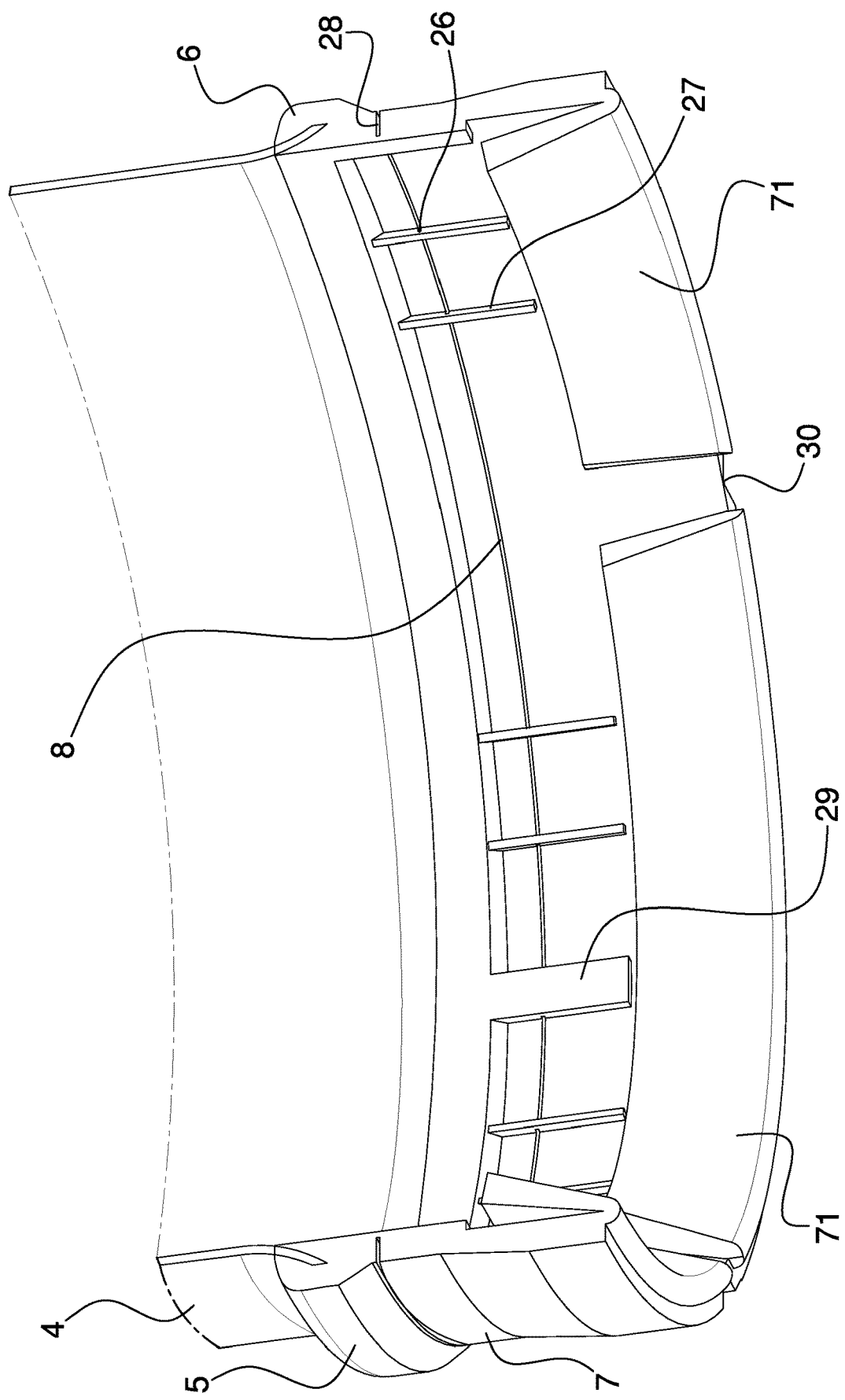
FIG. 17 is a sectioned partial view of the capsule of FIG. 14.

As illustrated in FIG. 13, the production line may include a cutting machine SCM for cutting (without folding) the anti-tamper device (safety ring 5) arranged downstream of the press PTV and/or of the screen VTV and/or of the edgebander BTV and/or of the apparatus 9. This production line may be suitable, in particular, for forming the capsule illustrated in FIG. 9.

The operation of the moulding apparatus 9 may implement at least one part of a moulding method that, in particular, may include the following steps.

In an initial step, the capsule body 2 comprising at least one annular wall 4 made of metallic material is provided. This step may include the process operations that are performed in the screw cap press PTV and/or in the screw cap screen VTV and/or in the screw cap edgebander BTV and/or in the machine PMV for moulding seals.

The capsule body 2 may then be arranged in the mould for forming the safety ring 5. In this step of arranging (inserting) the capsule body 2 in the moulding apparatus 9, the two mould half-portions 11 may be arranged in an open configuration (mould half portions 11 are moved away from one another).

Owing to the subsequent closing of the two mould half-portions 11 it is thus possible to define a moulding cavity 12 in the mould that is suitable for overmoulding the safety ring 5 on the annular wall 4. The step of overmoulding the safety ring 5 on the annular wall 4 may include, for example, introducing a dose of synthetic plastic material into the moulding cavity 12. The dose of synthetic plastic material may be separated from the extruding nozzle by at least one movable cutting and separating element that could be coupled with the pushing element 14. This dose is then inserted into the inlet channel 13. The pushing element 14 may then advance in a direction H to fill the moulding cavity 12.

The step of defining the moulding cavity 12 may include defining three annular sealing zones to prevent leakage of synthetic plastic material from the moulding cavity 12. A first annular sealing zone 18 of the plastic material may be arranged between a first surface 19 (on the inner side) of the capsule body 2 and the mould first portion 10 inserted into the capsule body 2. The aforesaid first surface 19 of the capsule body 2 may be arranged on the annular wall 4. A second annular sealing zone 20 of the synthetic plastic material may be arranged between a second surface 21 (on the outer side) of the capsule body 2 and the two mould half portions 11. The aforesaid second surface 21 of the capsule body 2 may be arranged on the annular wall 4. A third annular sealing zone 22 of the synthetic plastic material may be arranged between the mould first portion 10 and the two mould half-portions 11. Another sealing zone of the synthetic plastic material may be arranged between the pushing element 14 (piston) and the inlet channel 13 (piston chamber).

Figure 7:
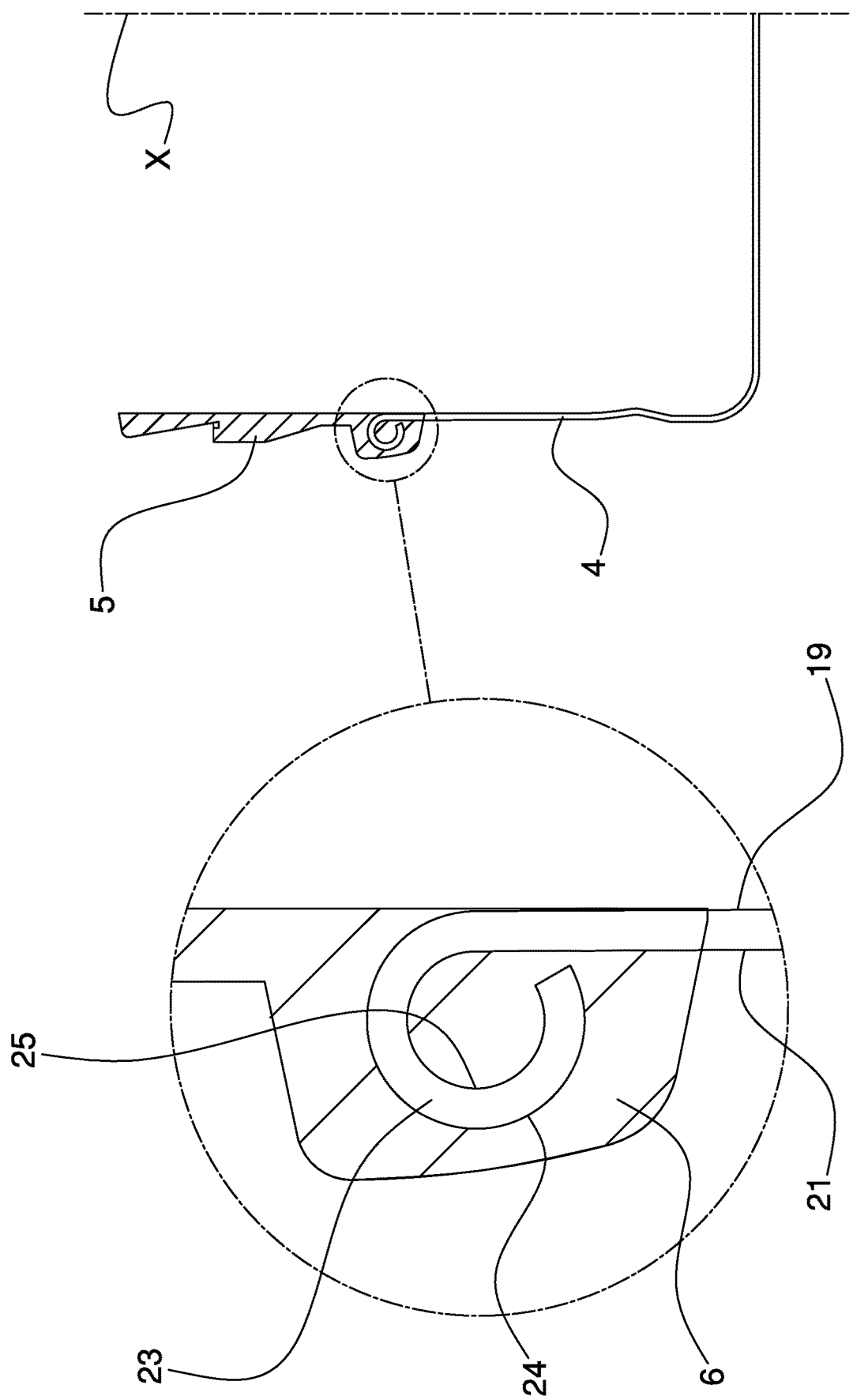
FIG. 7 is a half-section of a second embodiment of a capsule made with a method according to the invention.
Figure 8:
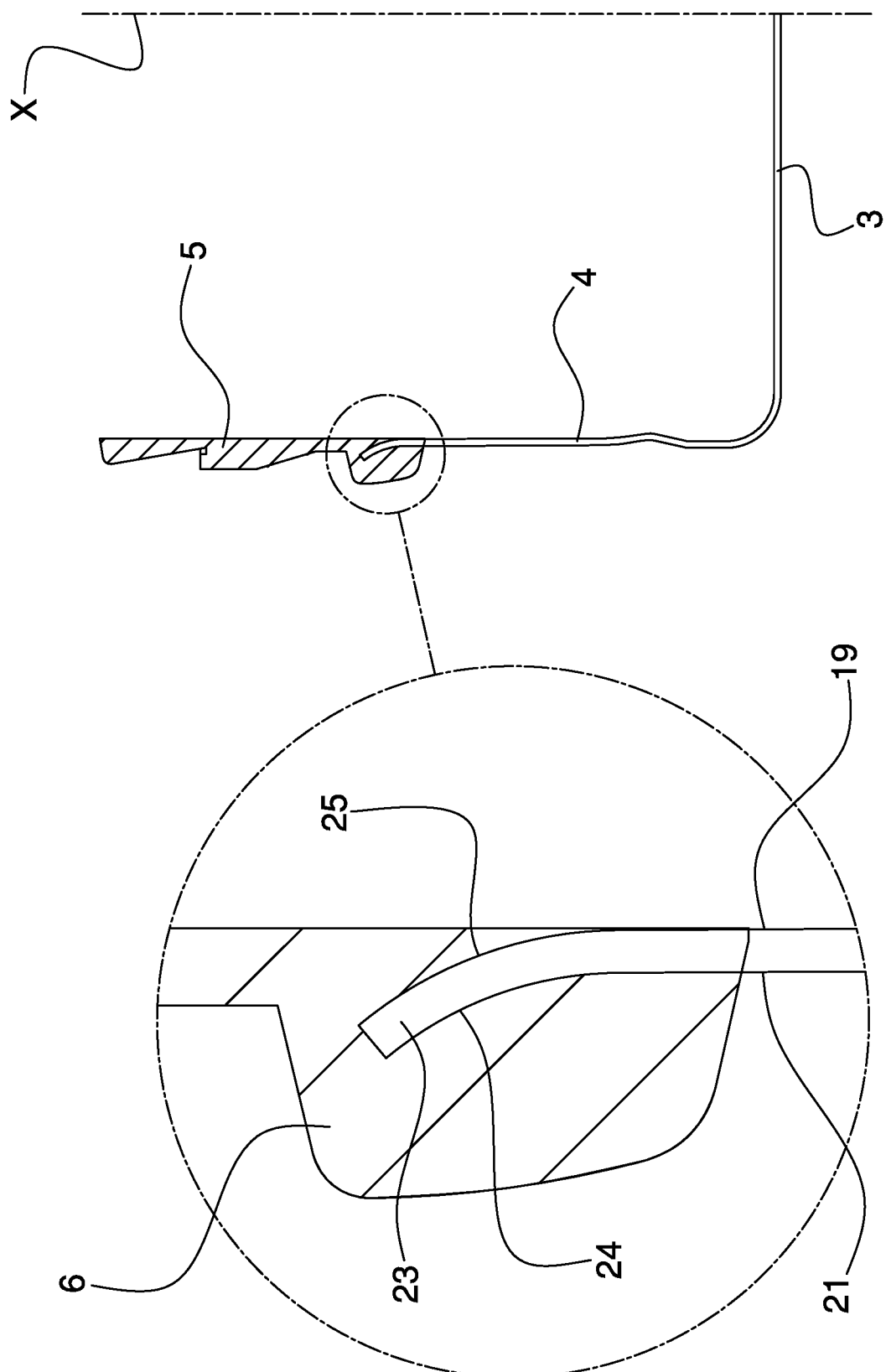
FIG. 8 is a half-section of a third embodiment of a capsule made according to a method embodiment of the invention.

In accordance with the capsule embodiments of FIGS. 7-8, at least one part of the connecting portion 6 surrounds at least one end portion 23 of the side annular wall 4. This end portion 23 may include, in particular, an annular edge embedded in the connecting portion 6 so as to have at least two annular surfaces, an outer surface 24 and an inner surface 25, in contact with the synthetic plastic material of the connecting portion 6, where "outer" and "inner" are defined with reference to a radial direction with respect to the axis X of the capsule. The end portion 23 may include, as in the embodiments of FIGS. 7-8, an outwardly folded annular edge.

In other words, the annular wall 4 is immersed in the connecting portion 6 so as to have both opposite sides "wetted" by the synthetic plastics.

Embedding the end portion 23 enables a particularly strong and durable connection to be obtained between the capsule body 2 and the safety ring 5. Further, as the edge of the end portion 23 is immersed inside the connecting portion 6, the risk that a raw cutting or pointed edge of the metal capsule body 2 may prick a finger of a user is reduced.

The aforesaid annular edge may be folded, for example, so as to form a folded edge enclosed on itself, with a substantially ring-shaped section (FIG. 7), or a slightly folded edge, with an open section tilted by an angle comprised between 0° and 90°, or between 0° and 60°, or between 0° and 45°, or between 10° and 90°, or between 10° and 60°, or between 10° and 45°, with respect to the axis of the capsule (FIG. 8), or with a curved open section, for example radiating with a radius of more than 1 mm, or greater than 2 mm, or greater than 5 mm, or greater than 10 mm.

Figure 9:
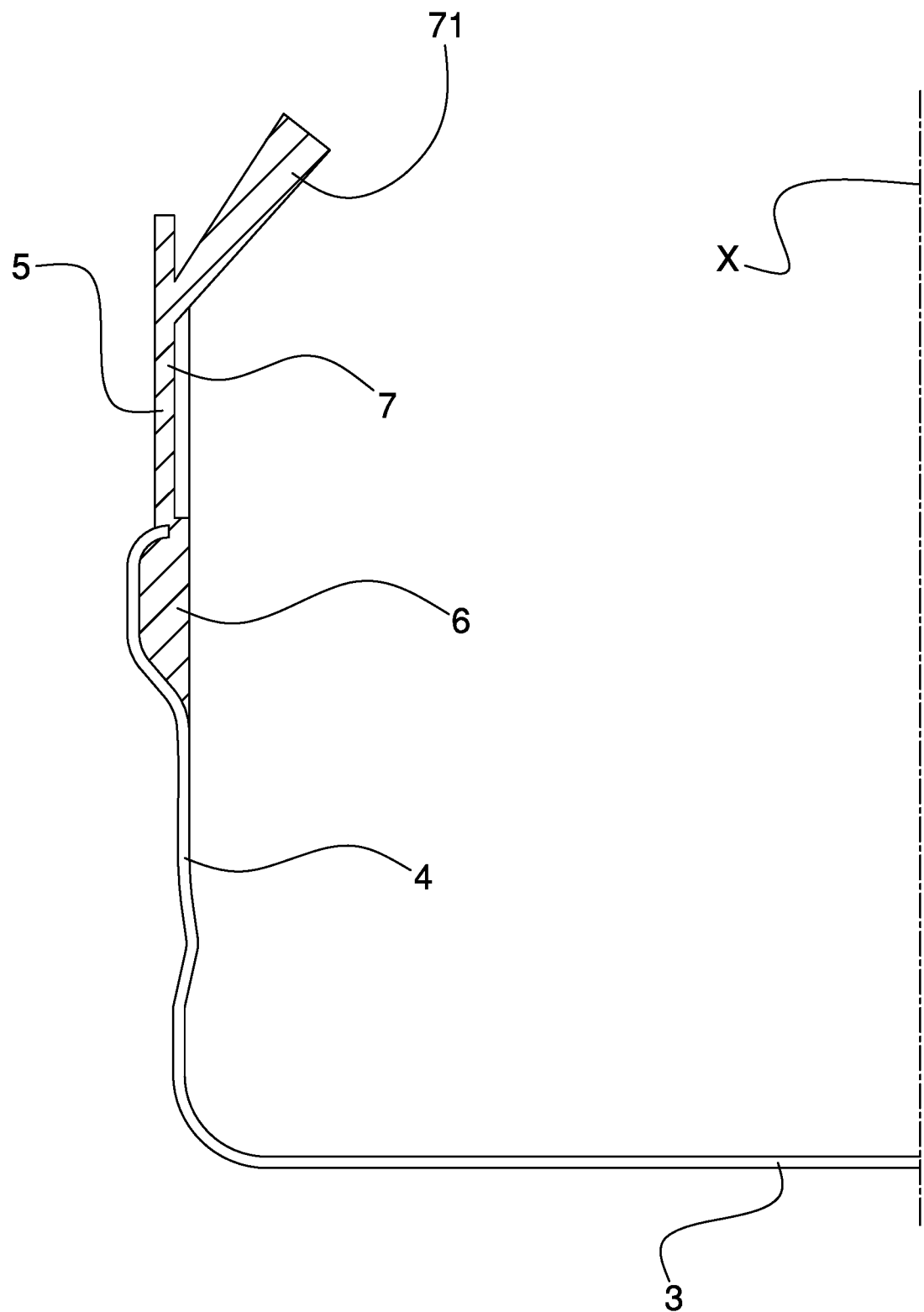
FIG. 9 is a half-section of a fourth embodiment of a capsule made according to a method embodiment of the invention.

As illustrated in FIG. 9 a capsule is provided in which the fin portion 71 of the detachable portion 7 is formed already partially folded inside the moulding cavity 12. In this case, the step of folding is facilitated and may be made in the seals moulding machine PMV (see plant of FIG. 13). The moulding apparatus may have, in this case, a further movable mould portion to enable the capsule to be extracted despite the undercut due to folding of the fin portion that is already inside the mould.

Figure 3:
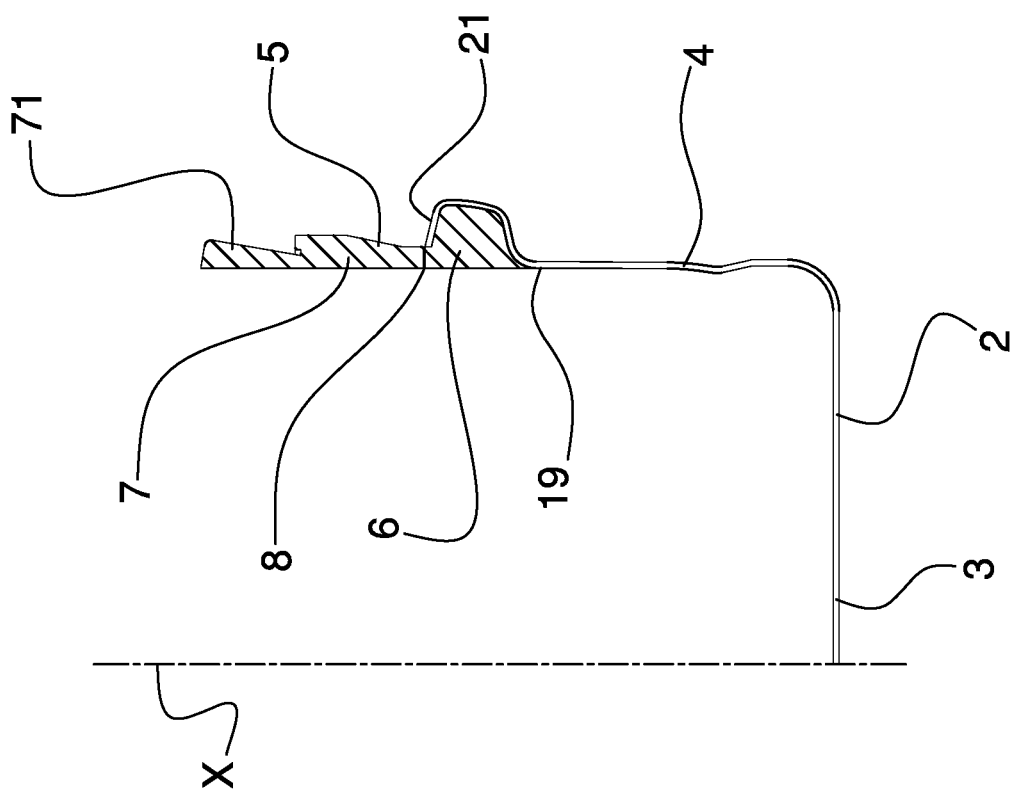
FIG. 3 is a half-section of the capsule in FIG. 1.
Figure 2:
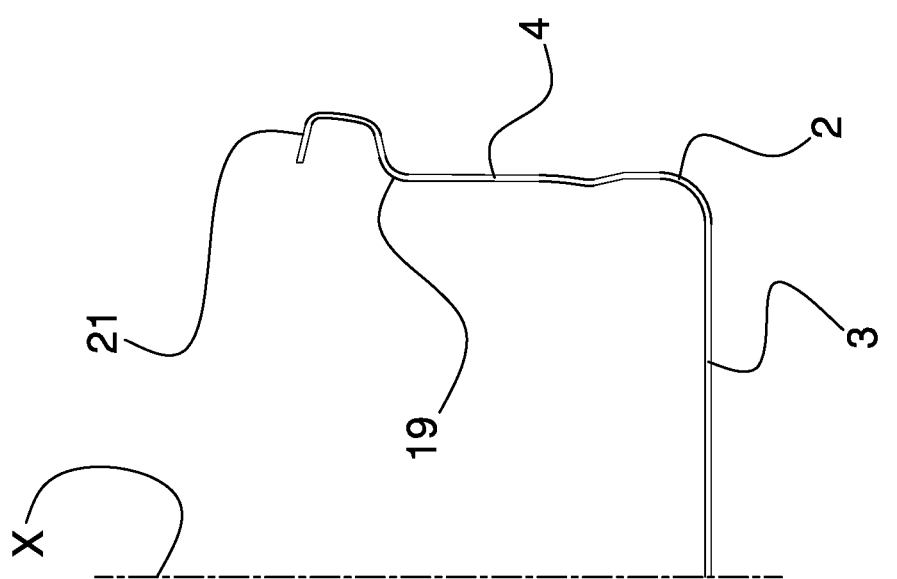
FIG. 2 is a half-section of a capsule body that is usable in the method for making the capsule in FIG. 1.

One end portion of the annular wall 4 may include, with particular reference to the embodiments of FIGS. 3 and 9, a concave annular edge towards the inside whose inner concave annular surface surrounds, contacts, and contains the connecting portion 6. The majority of the outer convex annular surface or the entire outer convex annular surface of the annular edge may therefore not be in contact with the synthetic plastic material.

The capsule of the embodiment of FIGS. 14-17 may include, in particular, as in the previous examples, the capsule body 2, the closing wall 3, the annular wall 4, the safety ring 5, the connecting portion 6, the detachable portion 7, the weakening zone 8, and the fin portion 71.

The weakening zone 8 may include, as also in the examples described above, a plurality of frangible bridges 26. In particular, the weakening zone 8 may include a plurality of ribs 27 extended longitudinally in the axial direction (in the direction of X-axis of the capsule) and at least one circumferential notch 28 that passes through the greater part of the annular wall of the capsule, leaving intact the frangible bridges 26 in correspondence of the ribs 27. The ribs 27 and the notch 28 are shaped and dimensioned so as to generate frangible bridges 26 capable of breaking at the opening of the capsule.

The capsule may include, as illustrated in FIG. 1, at least one rib 29 longitudinally extended in the axial direction (in the X axis direction of the capsule), substantially parallel to and of greater dimensions with respect to the ribs 27. In the specific examples, the rib 29 has the same thickness of the ribs 27 and a width least two, three, four, or more times greater than rib 27. The rib 29 may be traversed in part from the notch 28. The rib 29 is designed so as not to break at the opening of the capsule, unlike the frangible bridges 26 of the ribs 27, whereby the detachable portion 7 is separated from the connecting portion 6 in correspondence of the bridges 26, but remains connected via the rib 29, so that when at the opening the cap is removed from the container, the detachable portion 7 remains attached to the rest of the capsule and thus does not remain on the container. The detachable portion 7 serves as a tamper-evident band comprising an annular wall connected to the connecting portion 6 by frangible and non-frangible elements (in which the non-frangible element includes, for example, at least one enlarged element not intended to breakage, as the rib 29), so that the tamper-evident band is not separated completely from the rest of the capsule, but remains attached by non-frangible elements. This is because the capsule anti-tamper band must not remain on the container, for example glass which may be recycled and reused. The breaking of the bridges 26 still leaves a visible sign of openness with an anti-tamper function.

The non-frangible elements, which connect the tamper-evident band (detachable portion 7) with the connecting portion 6 (fixed to the metal capsule body 2), may include, in particular, two, three or more ribs 29. In the specific case four ribs 29 are arranged angularly spaced (at 90°).

The detachable portion 7 may include, in particular, at least one frangible line 30 that is continuous and longitudinally extended in the axial direction (parallel to the X axis of the capsule). The frangible line 30 may extend longitudinally, as in the example of FIGS. 14-17, for the most part (more than half) of the axial length of the detachable portion 7. The frangible line 30 may extend up to a lower end edge of the detachable portion 7, from which the inward folded fin portion 71 originates. The detachable portion 7 may include, in particular, a plurality of frangible lines 30. In this specific case four frangible lines 30 are arranged angularly spaced at 90°.

Each frangible line 30 may include a thin wall arranged on the bottom of a longitudinal recessed portion formed on the outer surface of the detachable portion 7. Each frangible line 30 is located in correspondence with a discontinuity of the fin portion 71 (arranged inside), i.e. in an empty zone of separation between two adjacent fins. In the specific case, the fin portion 71 includes four inwardly folded and circumferentially spaced fins, equal to the number (four) of frangible lines 30. Each frangible line 30 may be arranged opposite to a zone where there is the gap separating two adjacent fins.

The non-frangible element, which maintains a connection between the detachable portion 7 and the connecting portion 6 after opening, may include two or more, in this example, four ribs 29. The longitudinal frangible element may include, in particular two or more, in this example, four frangible lines 30. Each connecting rib 29 may be disposed in the circumferential space between two frangible lines 30, in particular substantially halfway between two frangible lines 30.

The inwardly folded fin portion 71 is intended, at the unscrewing of the cap, to go into contact with a projection on the neck of the container, which acts by abutment, so as to break the frangible element, namely bridges 26, arranged in the weakening zone 8 which divides the detachable portion 7 from the connecting portion 6. At the first opening of the container, the inwardly folded portion is hooked to the projection of the container, causing the frangible bridges 26 to rupture.

The detachable portion 7 is kept connected to the connecting portion 6, and thus connected to the capsule body 2 via the non-frangible elements (ribs 29) of an appropriate size so that rupture does not occur.

The frangible elements (lines 30) extending longitudinally on the detachable portion 7 (including one or more weakened portions in the form of thin walls is also intended to rupture upon the initial unscrewing of the cap. In particular, the longitudinal frangible elements (lines 30) may be structured in such a way as to define two or more (in the specific case four) annular wall sectors which, at the breaking of the axial longitudinal frangible element, can expand to allow the opening of the capsule passing over an annular protrusion on the container neck.

After the breaking of the bridges 26, by continuing the unscrewing of the cap, at a certain point the longitudinal frangible elements (lines 30) are broken, passing over the projection on the container neck and permitting the bottle to be opened.

The invention claimed is:

1. A molding method, comprising the steps of (a) providing a capsule body including at least one metallic annular wall; (b) arranging said capsule body in a mold; (c) defining a molding cavity in said mold adapted to over-mold a safety ring on the at least one metallic annular wall comprising the steps of; (1) defining a first annular sealing zone between a first surface of the capsule body and a mold first portion inserted into the capsule body; (2) defining a second annular sealing zone between a second surface of the capsule body opposite the first surface of the capsule body and at least two mold half-portions operable between open and closed positions to permit the capsule body to be arranged in the mold; and (3) defining a third annular sealing zone between the mold first portion and the at least two mold half-portions; and (d) over-molding the safety ring on the annular wall of the capsule body by introducing a synthetic plastic material into the first, second and third sealing zones of the molding cavity.

2. The method according to claim 1, wherein at least one of the first surface and the second surface of the capsule body is a component of the at least one annular wall.

3. The method according to claim 1, and further comprising a step of weakening the safety ring by at least one of a cutting apparatus and a folding apparatus which folds a fin portion of the safety ring inwardly to form a fracture zone.

4. The method according to claim 3, and further comprising a step of forming a seal on the capsule body after one of the overmolding step and the weakening step.

5. The method according to claim 1, and further comprising a step of removing the capsule body with the safety ring from the mold first portion with an extractor that slides within the first mold portion to engage the capsule body.

* * * * *